(12) United States Patent
Nakagawa

(10) Patent No.: US 10,461,548 B2
(45) Date of Patent: Oct. 29, 2019

(54) VEHICLE

(71) Applicant: HONDA MOTOR CO., LTD., Tokyo (JP)

(72) Inventor: Tomoaki Nakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 15/916,487

(22) Filed: Mar. 9, 2018

(65) Prior Publication Data

US 2018/0264960 A1    Sep. 20, 2018

(30) Foreign Application Priority Data

Mar. 15, 2017   (JP) ................................ 2017-050277

(51) Int. Cl.
*H02J 7/00*        (2006.01)
*B60L 1/06*        (2006.01)
(Continued)

(52) U.S. Cl.
CPC .............. *H02J 7/0027* (2013.01); *B60L 1/06* (2013.01); *B60L 50/53* (2019.02); *B60L 53/12* (2019.02);
(Continued)

(58) Field of Classification Search
USPC .................................................. 320/107, 108
See application file for complete search history.

(56) References Cited

U.S. PATENT DOCUMENTS 8,483,899 B2 *   7/2013   Martin ................. B62D 15/028
                                                               701/22
8,796,990 B2 *   8/2014   Paparo .................... H01F 38/14
                                                               320/108
(Continued)

FOREIGN PATENT DOCUMENTS

JP      H07-087607 A     3/1995
JP      2011-015548 A    1/2011
(Continued)

OTHER PUBLICATIONS

Mar. 5, 2019, Japanese Office Action issued for related JP Application No. 2017-050277.
(Continued)

*Primary Examiner* — M Baye Diao
(74) *Attorney, Agent, or Firm* — Paratus Law Group, PLLC

(57) ABSTRACT

A vehicle includes: a power receiving device configured to receive power from a power transmission device in a non-contact manner in a state of facing the power transmission device; a housing configured to store a power reception port to which an external power system is connected via a connecting tool, the housing including: an opening allowing access to the power reception port therethrough; a lid member covering the opening to be openable and closable; and a locking mechanism configured to lock the lid member in a state of closing the opening; and a controller configured to control whether access to the power reception port is permitted, and configured to drive the locking mechanism when the power receiving device starts receiving power such that the lid member is locked not to be opened.

7 Claims, 4 Drawing Sheets

(51) Int. Cl.
*B60L 53/16* (2019.01)
*B60L 50/53* (2019.01)
*B60L 53/12* (2019.01)
*B60L 53/60* (2019.01)

(52) U.S. Cl.
CPC .............. *B60L 53/16* (2019.02); *B60L 53/60* (2019.02); *B60L 2250/16* (2013.01); *Y02T 10/7005* (2013.01)

(56) References Cited

U.S. PATENT DOCUMENTS

| | | | |
|---|---|---|---|
| 9,197,093 B2 * | 11/2015 | Sagata | H02J 50/80 |
| 9,515,418 B2 * | 12/2016 | Yoshizawa | B60K 1/04 |
| 9,586,490 B2 * | 3/2017 | Yamamaru | B60K 15/05 |
| 9,656,561 B2 * | 5/2017 | Yoo | B60L 11/1818 |
| 9,859,709 B2 * | 1/2018 | Sakamoto | B60L 1/00 |
| 9,889,755 B2 * | 2/2018 | Frament | B60L 11/182 |
| 2012/0101659 A1 | 4/2012 | Kim et al. | |
| 2012/0153717 A1 | 6/2012 | Obayashi et al. | |

FOREIGN PATENT DOCUMENTS

| | | |
|---|---|---|
| JP | 2012-090514 A | 5/2012 |
| JP | 2012-130193 A | 7/2012 |
| JP | 2014-050193 A | 3/2014 |
| JP | 2014-120233 A | 6/2014 |
| JP | 2016-063695 A | 4/2016 |
| JP | 2017-135942 A | 8/2017 |

OTHER PUBLICATIONS

Sep. 11, 2018, Japanese Office Action issued for related JP application No. 2017-050277.

* cited by examiner

VEHICLE

CROSS-REFERENCE TO RELATED APPLICATION

The present application claims the benefit of priority of Japanese Patent Application No. 2017-050277, filed on Mar. 15, 2017, the content of which is incorporated herein by reference.

BACKGROUND

1. Field of the Invention

The present invention relates to a vehicle capable of performing both non-contact power reception and contact power reception.

2. Description of the Related Art

JP-A-2014-50193 discloses a vehicle including a secondary battery, a contact charging unit for charging the secondary battery with power supplied via a power cable from an external power supply, and a non-contact charging unit for charging the secondary battery with power supplied from an external power supply without using a power cable. The vehicle allows a user to easily and intuitively recognize the charging state and reduces inconvenience that the user unnecessarily performs a contact charging operation. As a means for easily and intuitively informing about the charging state, the vehicle is provided with a state display unit installed near a connection port to which a connector of the power cable is connected. The state display unit displays the charging state of the secondary battery while the secondary battery is being charged with the non-contact charging unit. As a result, a user who intends to perform contact charging by connecting the connector to the connection port can easily recognize whether non-contact charging is in progress.

According to the vehicle disclosed in JP-A-2014-50193, when the secondary battery is charged with the non-contact charging unit, the state display unit displays the charging state of the secondary battery. Therefore, the user can easily recognize that the non-contact charging is in progress and can connect the connector of the power cable to the connection port even during non-contact charging. Therefore, although the user recognizes that the non-contact charging is in progress, there may be a case that the user initiates contact charging during the non-contact charging by mistakenly believing that simultaneous execution of contact charging and non-contact charging speeds up the complete charging of the secondary battery.

However, the simultaneous execution of non-contact charging and contact charging is not desirable because it not only imposes an excessive load on the parts inside the vehicle but also accelerates deterioration of the secondary battery.

SUMMARY

An object of the present invention is to provide a vehicle capable of preventing simultaneous execution of non-contact power reception and contact power reception.

According to a first aspect of the invention, there is provided a vehicle including: a power receiving device configured to receive power from a power transmission device in a non-contact manner in a state of facing the power transmission device; a housing configured to store a power reception port to which an external power system is connected via a connecting tool, the housing including: an opening allowing access to the power reception port therethrough; a lid member covering the opening to be openable and closable; and a locking mechanism configured to lock the lid member in a state of closing the opening; and a controller configured to control whether access to the power reception port is permitted, and configured to drive the locking mechanism when the power receiving device starts receiving power such that the lid member is locked not to be opened.

According to a second aspect of the invention, the vehicle according to the first aspect, further includes a first display unit in a passenger compartment, the first display configured to display that the power receiving device is receiving power when the lid member is locked not to be opened by the locking mechanism.

According to a third aspect of the invention, in the vehicle according to the first aspect or the second aspect, further includes a second display unit in the passenger compartment, the second display unit configured to display that the locking mechanism is in operation when the lid member is locked not to be opened by the locking mechanism.

According to a fourth aspect of the invention, the vehicle according to any one of the first to third aspects, further includes an illumination unit provided on or around the lid member, the illumination unit configured to light up or flicker when the lid member is locked not to be opened by the locking mechanism.

According to a fifth aspect of the invention, the vehicle according to any one of the first to fourth aspects, further includes a notification unit configured to send an electronic notification, indicating that the power receiving device is receiving power, to a portable terminal capable of operating the vehicle when the lid member is locked not to be opened by the locking mechanism.

According to a sixth aspect of the invention, the vehicle according to any one of the first to fourth aspects, further includes a notification unit configured to send an electronic notification, indicating that the locking mechanism is in operation, to a portable terminal capable of operating the vehicle when the lid member is locked not to be opened by the locking mechanism.

According to a seventh aspect of the invention, in the vehicle according to any one of the first to sixth aspects, the controller releases the locking operation of the locking mechanism to bring the lid member into an openable state when the power receiving device stops receiving power.

According to the first aspect, when the power receiving device starts receiving power from the power transmission device in a non-contact power transmission manner, the locking mechanism of the housing operates such that the lid member falls in a locked state where the lid member cannot be opened. Therefore, it is impossible to make access to the power reception port in the housing. In this way, since it is impossible to connect the connecting tool to the power reception port after non-contact power transmission is started, simultaneous execution of contact power reception and non-contact power reception can be prevented. As a result, no excessive load is applied to parts inside the vehicle, and deterioration of the secondary battery charged with received power can be prevented.

According to the second aspect, a driver or the like can recognize that the non-contact power reception is in progress in the passenger compartment.

According to the third aspect, a driver or the like can recognize that the lid member is in a locked state in the passenger compartment.

According to the fourth aspect, when a driver or the like intends to open the lid member, the driver or the like can visually recognize that the lid member is in the locked state.

According to the fifth aspect, a person having a portable terminal can recognize that the non-contact power reception is in progress while being outside the vehicle.

According to the sixth aspect, a person having a portable terminal can recognize that the lid member is in the locked state while being outside the vehicle.

According to the seventh aspect, since the locking mechanism continuously operates until the non-contact power reception stops, the connecting tool cannot be attached to the power reception port during the non-contact power reception. Therefore, it is possible to prevent simultaneous execution of non-contact power reception and contact power reception.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinbelow, one embodiment of the present invention will be described with reference to the accompanying drawings. The drawings are viewed in the directions of reference signs. In the following description, front and back, left and right, and up and down are directions viewed by a driver, and front, rear, left, right, upper, and lower sides of a vehicle will be denoted by reference signs Fr, Rr, L, R, U, and D, respectively.

Figure 1:
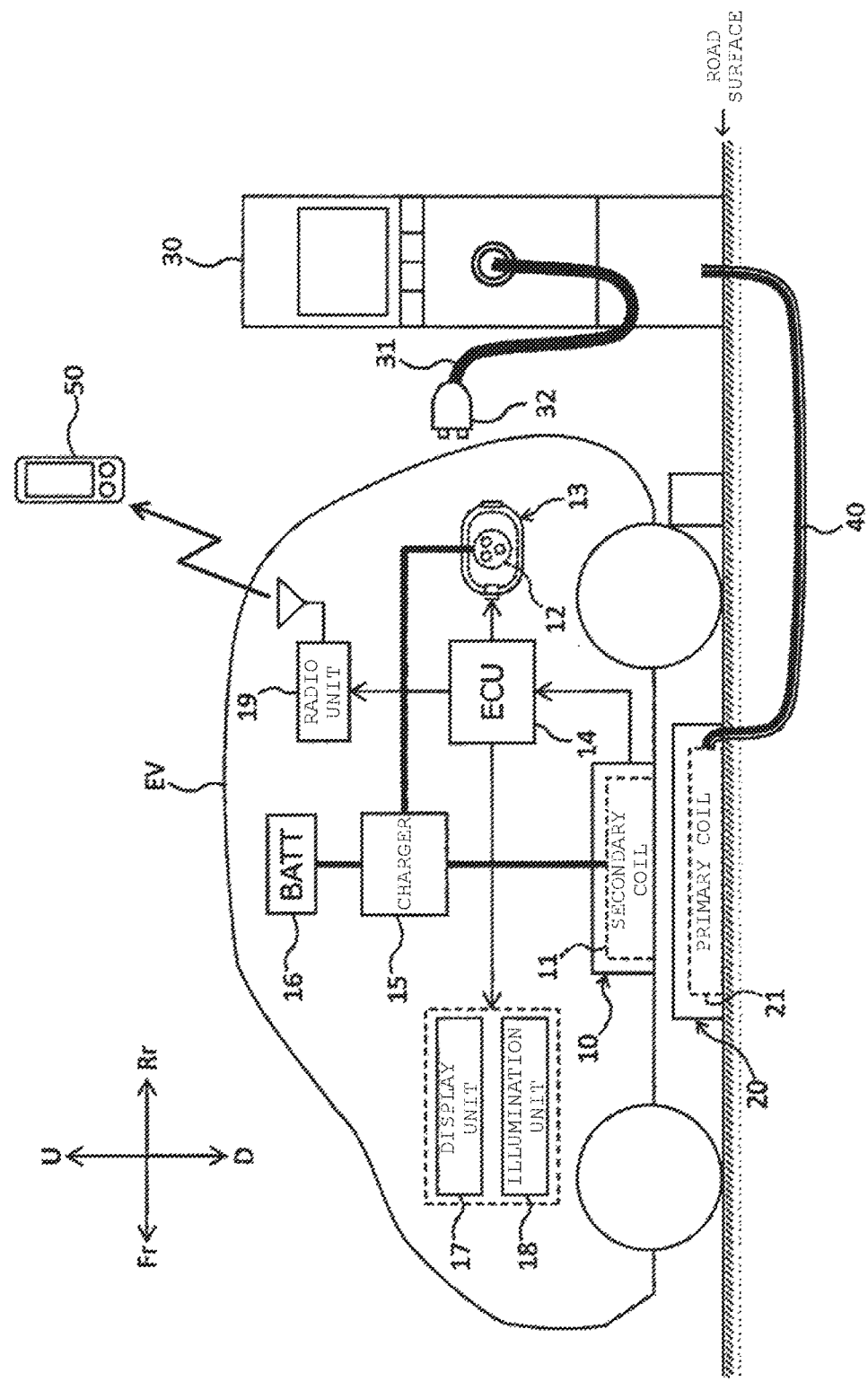
FIG. 1 is a side view illustrating a state where an electric vehicle is parked at a parking position where a power transmission device is installed.

FIG. 1 is a side view illustrating a state where an electric vehicle is parked at a parking position where a power transmission device is installed. As illustrated in FIG. 1, a power transmission device 20 installed at a parking position of an electric vehicle EV having a power receiving device 10 which receives AC power in a non-contact manner is installed on a road surface or the like constituting a parking facility. The power transmission device 20 is connected to an external power system such as a commercial power supply or the like via a power supply unit 30. Non-contact power transmission from the power transmission device 20 to the power receiving device 10 can be performed in a state where the electric vehicle EV is stopped at a position where the power receiving device 10 thereof faces the power transmission device 20. In addition, power transmission from the power supply unit 30 to the electric vehicle EV also can be performed via a connecting tool.

Each constituent element of the system illustrated in FIG. 1 will be described below.

The power transmission device 20 has a primary coil 21, and the power receiving device 10 of the electric vehicle EV has a secondary coil 11. Therefore, when a current flows through the primary coil 21 of the power transmission device 20 due to the AC power supplied from the external power system in a state where the winding surfaces of the respective coils face each other and are close to each other, induced electromotive force is generated in the power receiving device 10 due to an electromagnetic induction effect, and the induced current flows through the secondary coil 11. In this way, the power receiving device 10 receives power from the power transmission device 20 in a non-contact manner, and a battery 16 of the electric vehicle EV is charged via a charger 15 with the inducted current flowing through the secondary coil 11 (non-contact charging).

The power supply unit 30 is connected to an electrical grid via a power distribution facility or the like (not illustrated) and controls the supply of AC power to the power transmission device 20 or the electric vehicle EV. The power supply unit 30 and the primary coil 21 of the power transmission device 20 are connected by a power supply cable 40 buried under the road surface. Further, the power supply unit 30 includes a cable 31 for transferring AC power therethrough and a connector 32 provided at the tip end of the cable 31. In a state where the connector 32 is connected to a power reception port 12 of the electric vehicle EV, electric power is transmitted from the power supply unit 30 to the electric vehicle EV.

In addition to the above-described power receiving device 10, the electric vehicle EV includes the power reception port 12, the housing 13 that stores the power reception port 12, an electronic control unit (ECU) 14, the charger 15, the battery 16, a display unit 17, an illumination unit 18, and a radio unit 19.

The power reception port 12 is an inlet to which the connector 32 of the power supply unit 30 is connected. AC power supplied via the power supply unit 30 from the external power system (commercial electrical grid or the like) is input to the power reception port 12 to which the connector 32 is connected via the cable 31 and the connector 32.

Figure 2A:
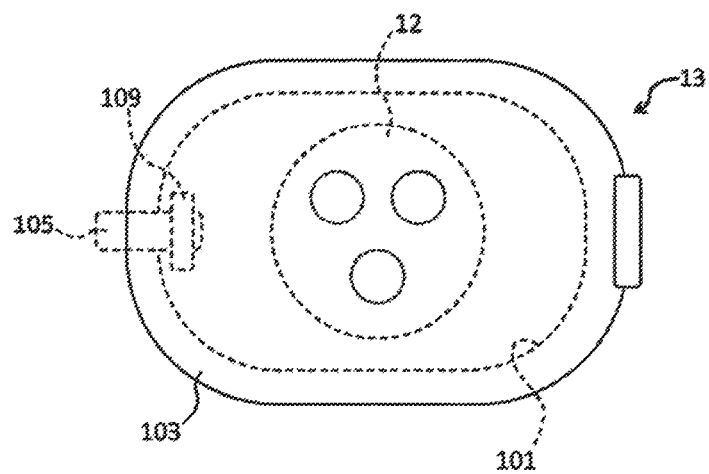
FIG. 2A is a front view illustrating a housing in a state where a lid member closes and a locking mechanism is operated and FIG. 2B is a front view illustrating the housing in a state where the lid member opens.
Figure 2B:
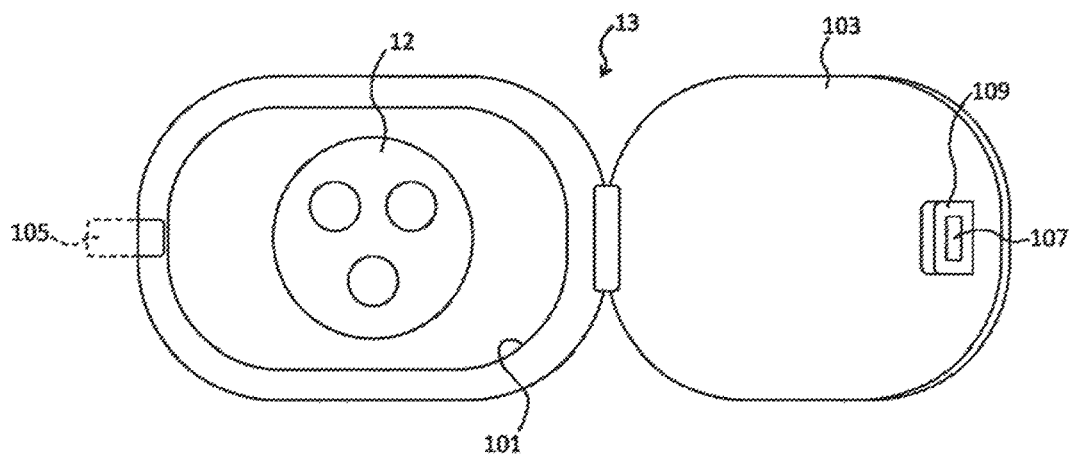

The housing 13 has an opening 101 allowing access to the power reception port 12 therethrough, a lid member 103 for covering the opening 101 so as to open and close the opening, and a locking mechanism 105 for locking the lid member 103 in a state where the lid member closes the opening 101. FIG. 2A is a front view illustrating the housing 13 in a state where the lid member 103 closes and the locking mechanism 105 is operated, and FIG. 2B is a front view illustrating the housing 13 in a state where the lid member 103 opens. As illustrated in FIGS. 2A and 2B, the power reception port 12 is provided in the opening 101 of the housing 13, and a connection portion between the power reception port 12 and the connector 32 is exposed to the outside when the lid member 103 is opened.

On the back surface of the lid member 103, a protrusion 109 having a hole 107 through which the locking mechanism 105 is inserted is provided. The locking mechanism 105 slides toward the opening 101 according to a drive control from the ECU 14. When the locking mechanism 105 slides toward the opening 101 in a closed state of the lid member 103, the locking mechanism 105 is in a state of passing through the hole 107 in the protrusion 109. At this time, the lid member 103 is locked, so that the lid member 103 is not opened even when trying to open it.

When the power receiving device 10 starts receiving power, the ECU 14 drives the locking mechanism 105 of the housing 13 so that the lid member 103 enters the closed state. The ECU 14 determines whether the power receiving device 10 has started receiving power based on a signal sent from the power receiving device 10 or based on the value of the induced current flowing through the secondary coil 11 of the power receiving device 10. Conversely, when the power receiving device 10 stops receiving power, the ECU 14 releases the locking operation of the locking mechanism 105 to bring the lid member 103 into an openable state. The determination of whether the power receiving device 10 has stopped receiving power is performed based on a signal sent from the power receiving device 10 or based on the value of the induced current flowing through the secondary coil 11 of the power receiving device 10 similarly to the determination at the start.

The charger 15 converts an AC voltage obtained from the power receiving device 10 or an AC voltage obtained from the power supply unit 30 via the power reception port 12 into a direct current (DC) voltage. The battery 16 is charged with the power converted into the DC voltage by the charger 15.

Figure 3A:
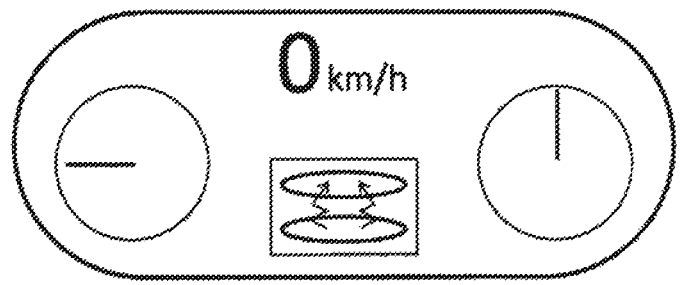
FIG. 3A is a view illustrating a display example of an indicator displaying that a power receiving device is receiving power and FIG. 3B is a view illustrating a display example of the indicator displaying that the locking mechanism is in operation.
Figure 3B:
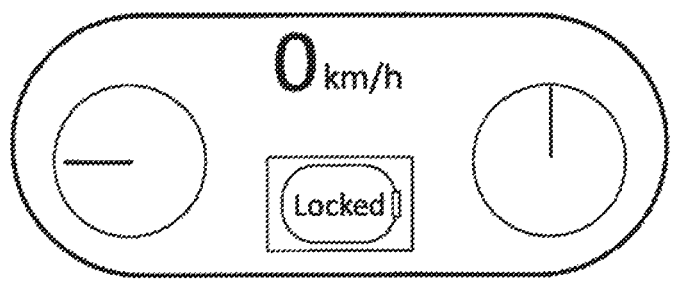

When the lid member 103 is locked not to be opened by the locking mechanism 105 of the housing 13, the display unit 17 displays that the power receiving device 10 is receiving power or that the locking mechanism 105 is in operation. The display unit 17 performs the display according to an instruction from the ECU 14. The display unit 17 is provided in a passenger compartment of the electric vehicle EV, for example, in an indicator installed in front of the driver seat of the electric vehicle EV. FIG. 3A is a view illustrating a display example of the indicator indicating that the power receiving device 10 is receiving power, and FIG. 3B is a view illustrating another display example of the indicator indicating that the locking mechanism 105 is in operation.

Figure 4:
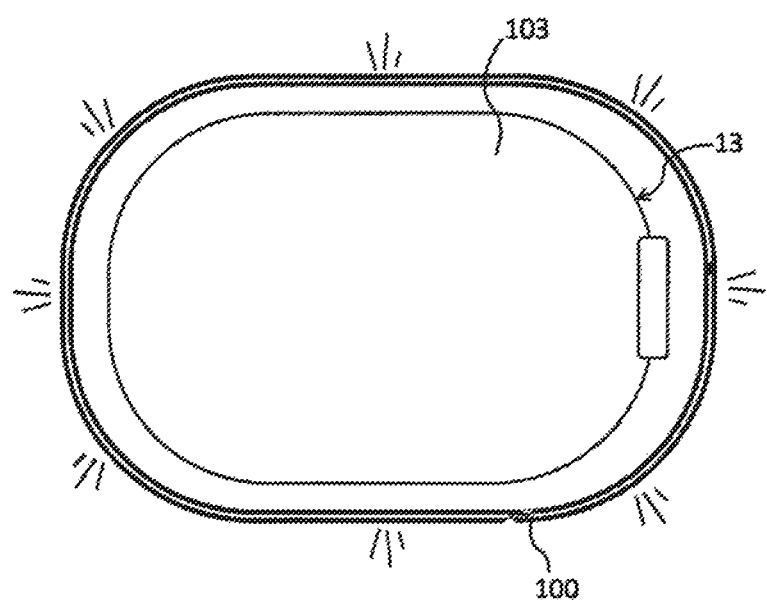
FIG. 4 is a view illustrating an illumination unit provided at a peripheral portion of the lid member to light up or flicker since the lid member is in a locked state.

The illumination unit 18 is turned on to light up or flicker when the lid member 103 is in a closed state by the locking mechanism 105 of the housing 13. The illumination unit 18 lights up or flickers according to an instruction from the ECU 14. The illumination unit 18 is provided on or around the lid member 103 of the housing 13. FIG. 4 is a view illustrating the illumination unit 18 provided around the lid member 103 to light up or flicker since the lid member 103 is locked not to be opened.

Figure 5A:
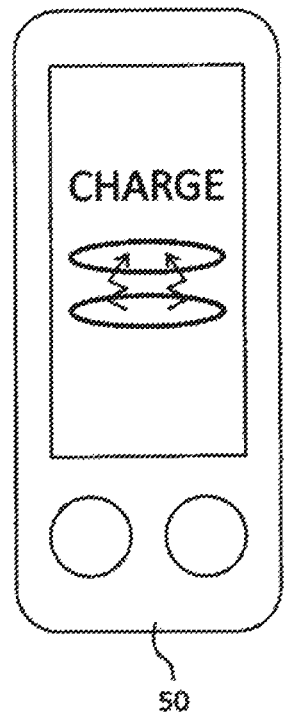
FIG. 5A is a view illustrating an example of a portable terminal displaying that the power receiving device is receiving power and FIG. 5B is a view illustrating an example of the portable terminal displaying that the locking mechanism is in operation.
Figure 5B:
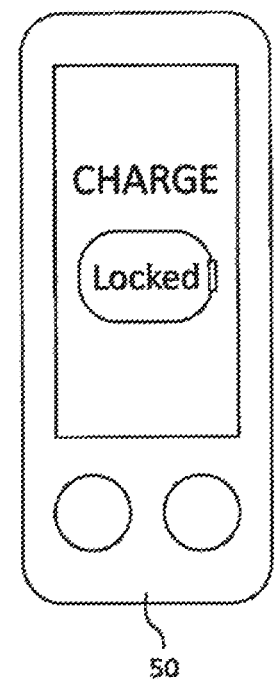

When the lid member 103 is locked not to be opened by the locking mechanism 105 of the housing 13, the radio unit 19 transmits an electronic notification (radio signal) indicating that the power receiving device 10 is receiving power or that the locking mechanist 105 is in operation to a predetermined portable terminal 50. The portable terminal 50 is a portable terminal with which the owner of the electric vehicle EV can operate the electric vehicle EV. Upon receiving the electronic notification transmitted by the radio unit 19, the portable terminal 50 displays the content of the electronic notification. FIG. 5A is a view illustrating an example of the portable terminal 50 displaying that the power receiving device 10 is receiving power, and FIG. 5B is a view illustrating an example of the portable terminal 50 displaying that the locking mechanism 105 is in operation.

As described above, according to the present embodiment, when the power receiving device 10 starts receiving power in response to the non-contact power transmission from the power transmission device 20, the locking mechanism 105 of the housing 13 operates to lock the lid member 103 such that the lid member 103 is not opened even when trying to open it. Therefore, the power reception port 12 in the housing 13 cannot be accessed. Further, the locking mechanism 105 continuously operates until the non-contact power reception stops. As described above, after the start of the non-contact power reception, since the connector 32 of the power supply unit 30 cannot be attached to the power reception port 12 at least during the non-contact power reception, it is possible to prevent simultaneous execution of the non-contact power reception and the contact power reception. As a result, no excessive load is applied to the charger 15 of the electric vehicle EV, and deterioration of the battery 16 can also be prevented.

When the lid member 103 is locked not to he opened by the locking mechanism 105 of the housing 13, since it is displayed on the indicator of the electric vehicle EV that the power receiving device 10 is receiving power or that the locking mechanism 105 is in operation, the driver or the like can recognize this state in the passenger compartment.

Further, when the lid member 103 is locked not to be opened by the locking mechanism 105 of the housing 13, since the illumination unit 18 lights up or flashes, when the driver or the like tries to open the lid member 103, the driver can visually recognize that the lid member 103 is locked.

Further, when the lid member 103 is locked not to be opened by the locking mechanism 105 of the housing 13, since the electronic notification (radio signal) indicating that the power receiving device 10 is receiving power or that the locking mechanism 105 is in operation is transmitted to the portable terminal 50, and the portable terminal 50 displays the content of the received notification, a person having the portable terminal 50 can recognize the above state while being outside the vehicle.

The present invention is not limited to the above-described embodiment, but may be appropriately modified, improved, and the like. For example, in the above-described embodiment, the locking operation of the locking mechanism of the housing 13 is cancelled when the power receiving device 10 stops receiving power. However, the locking operation of the locking mechanism may be cancelled even during the power reception of the power receiving device 10. For example, when an ignition switch (IGSW) of the vehicle is turned on to activate the vehicle, or when the door lock of the vehicle is released, the locking operation of the locking mechanism 105 may be cancelled even during the power reception of the power receiving device 10.

What is claimed is:
1. A vehicle comprising:
a power receiving device configured to receive power from a power transmission device in a non-contact manner in a state of facing the power transmission device;
a housing configured to store a power reception port to which an external power system is connected via a connecting tool, the housing including:
an opening allowing access to the power reception port therethrough;
a lid member covering the opening to be openable and closable; and a locking mechanism configured to lock the lid member in a state of closing the opening; and
a controller configured to control whether access to the power reception port is permitted, and configured to drive the locking mechanism when the power receiving device starts receiving power such that the lid member is locked not to be opened.

2. The vehicle according to claim 1, further comprising
a first display unit in a passenger compartment, the first display configured to display that the power receiving device is receiving power when the lid member is locked not to be opened by the locking mechanism.

3. The vehicle according to claim 1, further comprising
a second display unit in the passenger compartment, the second display unit configured to display that the locking mechanism is in operation when the lid member is locked not to be opened by the locking mechanism.

4. The vehicle according to claim 1, further comprising
an illumination unit provided on or around the lid member, the illumination unit configured to light up or flicker when the lid member is locked not to be opened by the locking mechanism.

5. The vehicle according to claim 1, further comprising
a notification unit configured to send an electronic notification, indicating that the power receiving device is receiving power, to a portable terminal capable of operating the vehicle when the lid member is locked not to be opened by the locking mechanism.

6. The vehicle according to claim 1, further comprising
a notification unit configured to send an electronic notification, indicating that the locking mechanism is in operation, to a portable terminal capable of operating the vehicle when the lid member is locked not to be opened by the locking mechanism.

7. The vehicle according to claim 1, wherein
the controller releases the locking operation of the locking mechanism to bring the lid member into an openable state when the power receiving device stops receiving power.

* * * * *